United States Patent [19]

Kottas

[11] 4,175,861
[45] Nov. 27, 1979

[54] SYSTEM FOR THE ALIGNMENT OF A LASER BEAM TRANSMITTER WITH A SIGHTING MECHANISM SET UP IN ANOTHER PLACE

[75] Inventor: Rolf Kottas, Hamburg, Fed. Rep. of Germany

[73] Assignee: "Laser-Light" Gesellschaft mit beschrankter Haftung, Hamburg, Fed. Rep. of Germany

[21] Appl. No.: 770,079

[22] Filed: Feb. 23, 1977

[30] Foreign Application Priority Data

Feb. 23, 1976 [DE] Fed. Rep. of Germany ....... 2607280

[51] Int. Cl.² ............................................. G01B 11/27
[52] U.S. Cl. ................................... 356/153; 356/154
[58] Field of Search ............................... 356/138–139, 356/150–154, 144, 146, 172

[56] References Cited

U.S. PATENT DOCUMENTS

| Re. 29,025 | 11/1976 | Hansen | 356/153 |
|---|---|---|---|
| 2,955,507 | 10/1960 | Leitz | 350/276 R |
| 3,588,255 | 6/1971 | Alexander | 356/172 |
| 3,612,700 | 10/1971 | Nelson | 356/153 |
| 3,617,135 | 11/1971 | Betz | 356/172 |
| 3,667,849 | 6/1972 | Appler et al. | 356/152 |
| 3,836,258 | 9/1974 | Courten et al. | 356/150 |

Primary Examiner—John K. Corbin
Assistant Examiner—Wm. H. Punter
Attorney, Agent, or Firm—James R. Cypher

[57] ABSTRACT

The invention concerns a system for the alignment of a laser beam transmitter with a transit or other sighting mechanism set up in another place by means of a contrivance on one of the instruments, which projects laser beams in a plane running through the principal axis of the instrument. The beams are registered by a receiving device on the other instrument through two windows lined up along its principal axis.

4 Claims, 8 Drawing Figures

SYSTEM FOR THE ALIGNMENT OF A LASER BEAM TRANSMITTER WITH A SIGHTING MECHANISM SET UP IN ANOTHER PLACE

BACKGROUND OF THE INVENTION

In the laying of sewer lines a laser beam transmitter is positioned in the ditch, and its beam, directed toward the target, serves as a guide for the alignment of the pipes. This beam must be properly aligned to give the desired slope as well as the direction. With the usual instruments the slope is adjusted at the laser beam transmitter, while the direction is determined by a transit or other sighting mechanism set up over the ditch, usually trained on a surveyor's rod or other object set up over the target point. The laser beam transmitter then must be aligned parallel to the sighting mechanism in the horizontal plane.

One well-known arrangement for this purpose connects the laser unit set up below with a telescopic sight set up above by means of a vertical rod. When the two instruments are fastened to the rod parallel, the sight can be aligned with the target, with the laser unit remaining parallel. The disadvantage of this arrangement is, however, the rod connecting the two instruments, which gets in the way of the construction work and greatly increases the amount of apparatus needed, the likelihood of disturbance, servicing required, etc.

Another system of this general type is familiar from U.S. Pat. No. 3,667,849. The arrangement involves a laser beam transmitter positioned over the construction ditch, which serves to take bearings on the distant target. Two beams are separated out from the original path of the transmitter and are then reflected down in the plane of the instrument's principal axis. An azimuth transfer device set up below in the ditch receives these two beams by means of windows lying in a plane parallel to its principal axis. Electronic sensers positioned under the windows serve to monitor the precise alignment. One of the beams received has its direction altered by 90° and is used as a directional beam in the construction ditch. This arrangement transmits an azimuth optically by means of precisely aligned laser beams, making a high degree of exactness possible. The troublesome connecting rod of the arrangement precisely discussed is no longer necessary.

This arrangement does, however, have the disadvantage that the sensing device only registers a response when the two instruments are already so precisely parallel and vertically aligned that the two parallel beams pass through the windows. The work crew must align the two units by hand until the two beams pass through the windows, a time consuming task when the two instruments are fairly far apart. If the instrument on top is set up at an angle to the horizontal—if, for example, the target is not in a horizontal plane with the instrument—the alignment of the two units is made extraordinarily difficult.

A further disadvantage is the fact that the sensing device combines optical and electronic elements. Electronic equipment is much too fragile for constant use on a construction site.

The object of this invention is, therefore, to devise a system of the type first mentioned, which will make possible quick and precise alignment of the two instruments without complicated electronic equipment and even when the instruments are set up under unfavorable circumstances.

The invention attains this object by providing (a) fixed optical means on the laser beam transmitter for producing a fan-shaped beam and (b) an eyepiece on the receiving device for the simultaneous observation of the two windows via appropriate optical means. The fan-shaped beam products at its point of impact a clearly visible line. If this beam falls on the surface of the instrument that is to be positioned, a line will be visible on that surface, which will make approximate alignment of the unit a simple matter. Since the beam produces a clearly visible line several meters long at the point of impact, given the usual distance of several meters between the two instruments, the two need no longer be set up in a vertical line. They can be shifted with respect to each other or set up with a relative angle of inclination. Thus the work of alignment is extraordinarily simplified and accelerated. The receiving device is much sturdier than the familiar electronic sensing device, since it involves only fixed optical elements.

The receiving device in the invention has a further advantage that both windows may be observed simultaneously via the eyepiece. That is, the operator sees the fan-shaped beam in both windows simultaneously when looking through the eyepiece, and he can perform precise alignments by utilizing the eye's ability to discriminate slight movements of the two visible lines relative to each other. Alignment according to the invention is at the very least the equal of alignment by electronic means.

Producing a fan-shaped beam from a laser beam is, of course, familiar from DT-OS 2 403 239. The arrangement described there produces such a beam by means of a rotating mirror driven by an electric motor. This arrangement represents the most advanced technology up to now in the area of construction lasers. Still, the arrangement with rotating mirror is only advantageous when angles up to 360° are to be utilized. In the case of the present arrangement this capacity is not necessary. Besides that, an arrangement with rotating mirrors would be too expensive for this purpose.

The system of this invention has the further advantage that the fixed optical means used to produce the fan-shaped beam consists of a cylindrical lens located in the path of the laser beam. Compared with the familiar rotating means for producing a fan-shaped beam, a cylindrical lens is very sturdy and extraordinarily simple in construction.

The system of the invention has the further advantage that the contrivance for projecting the beam involves a one-dimensional phase plate in the path of the laser beam, with its edge parallel to the principal axis of the instrument. Phase plates serve to produce a phase gap along one edge, where the phase plate has a thickness of the order of magnitude $\lambda/2$ of the length of light wave. With a coherent beam like a laser beam, a very sharp line of intensity zero is produced, which is still extraordinarily sharp at a considerable distance. The use of a phase plate with laser beams is described in detail in DT-OS 1 673 846 (now U.S. Pat. No. 3,617,135). Using a phase plate has the advantage that the bending of the beam at the edge makes a relatively long line along the zero line. Even without an additional cylindrical lens, a phase plate alone is suitable for producing an appropriate fan-shaped beam with a precise zero line. Use of a phase plate and a cylindrical lens in succession has the advantage of giving a longer zero line. In the present case the precision of alignment is increased by the use of a phase plate, since the zero line is very much sharper than the usually diffuse and relatively wide laser beam.

The system of the invention has the further advantage that the set of reflectors in the receiving device employs precisely congruent angles. The use of such a system allows the observer to tell exactly how much he must adjust the unit in order to bring it into precise alignment with the transmitter.

The system of the invention has the further advantage that the windows which allow beams to enter the receiving device are provided with ground glass screens. The clear picture on such a screen permits the beams to be clearly observed, even when skewed or off center. The ground glass screens can be advantageously marked with reference lines parallel to the principal axis of the device, which allow one to observe not only whether the receiving device is skewed but also whether the principal axis of the receiving unit coincides with the transmitted beam.

The system of the invention has the further advantage that the set of optical elements includes a five-sided prism and a 90° prism, positioned normal to the principal axis of the device, each of which, with the aid of a reflector, permits the operator to view one of the windows through the eyepiece. A five-sided prism has the property that the angle between the original beam and the refracted beam is always 90°. If the direction of the original beam is altered, the refracted beam is altered by the same angle and in the same direction. With a 90° prism, if the direction of the original beam is altered by a certain angle, the reflected beam is altered in the opposite direction but still by the same amount. So if the images on the ground glass screens move in opposed directions when the receiving unit is set at an angle to the fan-shaped beam, the images seen in the eyepiece through one or the other of the prisms will move apart also. Movement of the receiving unit parallel to the fan-shaped beam will show up as a simultaneous movement in the same direction of both images seen through the eyepiece. Thus, aligning the device is a simple matter, even for the untrained observer, since the two images will move relative to each other, at least when the alignment is skewed.

The system of the invention has the further advantage that the contrivance for projecting the laser beam is a part of the laser beam transmitter and alters the direction of its beam by 90°, before changing it into a fan-shape, by means of an adjustable reflector which is moveable into and out of the original path of the beam. In this way only one laser generator is needed, the one that is in any case a part of the transmitter. The reflector is only needed during alignment and can then be moved out of the path of the beam, so that the beam is directed forward as usual. An additional advantage here is the fact that the receiving unit is attached to a sighting mechanism, for example a telescopic sight, so that the alignment of the latter and the parallel positioning of the two units can be monitored in one place.

The system of the invention has the alternative advantage of mounting a receiving device on the laser beam transmitter, which automatically adjusts the axis of the transmitter to be parallel to the fan-shaped beam. In this arrangement only the telescopic sight or other sighting mechanism needs to be monitored, since the laser beam transmitter, which may in some cases be somewhat difficult to get to, automatically aligns itself. Means for automatic alignment are more easily built into the transmitter, since this unit will have various mechanisms for adjustment anyway.

The system of the invention has the final advantage that the laser beam transmitter may have an automatic levelling mechanism. This device, which will automatically keep the unit horizontal even when the ground under it is being moved and thus maintain the proper slope of the beam, allows the operator to concentrate solely on the alignment of the telescopic sight and the parallel alignment of the two units. It is difficult construction situation the work will be greatly simplified if one of the parameters of alignment does not need to be attended to, so that the surveying work will be done more accurately.

BRIEF DESCRIPTION OF THE DRAWINGS

The figures illustrate examples and schematic features of the invention.

FIG. 1 shows a laser beam transmitter 1 set by means of feet 2 on the bottom of a sewer shaft, for example. By means of adjustable feet or the like, the housing 3 of the laser beam transmitter is adjusted in the horizontal. If the laser generator 4, by way of example a helium-neon laser tube, is adjusted relative to the housing 3, the slope of the laser beam which would normally pass out the exit window 5 can be set to the desired value, which is determined by the job at hand, for example laying sewer-pipe.

DESCRIPTION OF THE PREFERRED EMBODIMENTS

Figure 1:
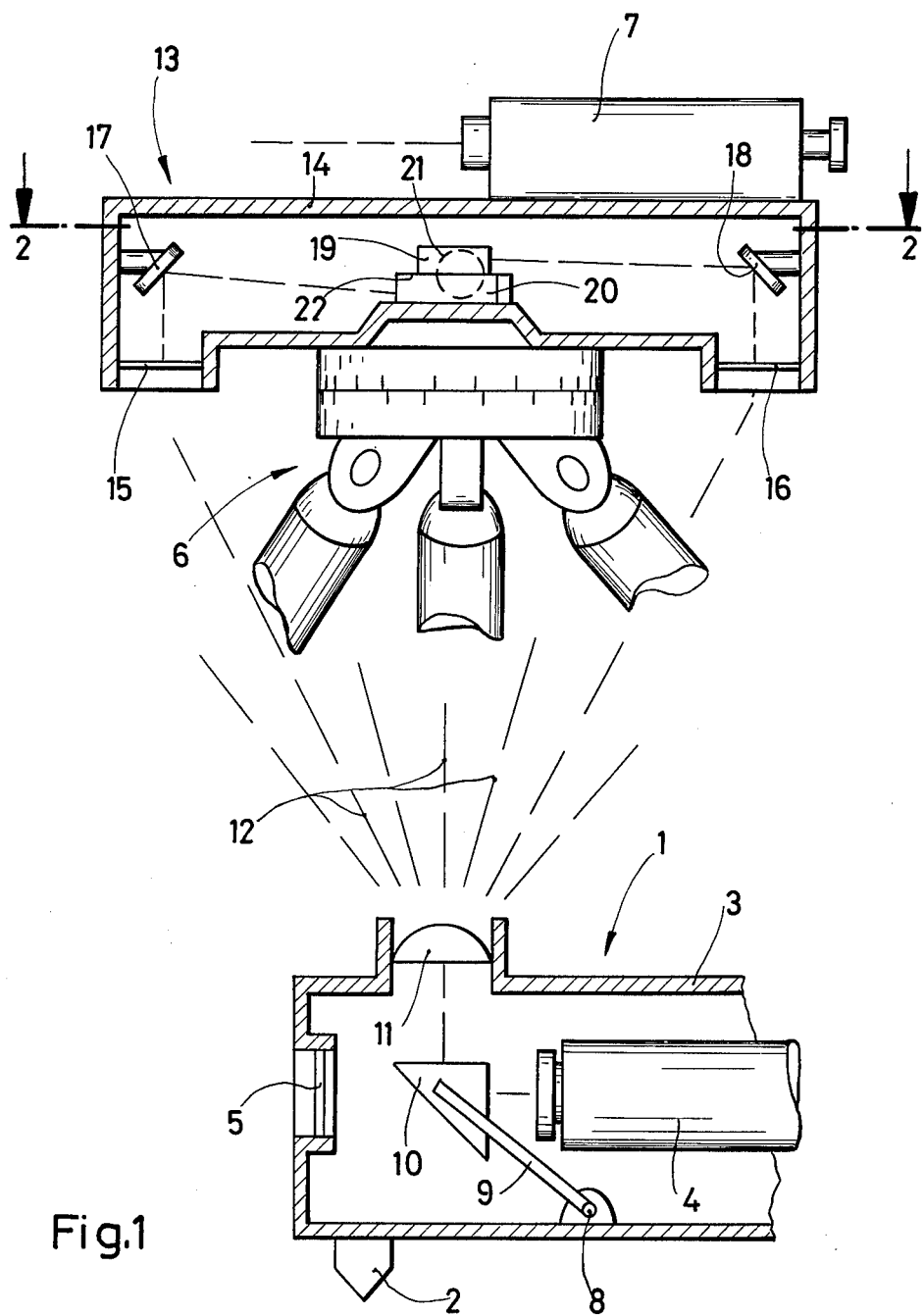
FIG. 1 represents a section along the line 1—1 in FIG. 2 through a receiving device mounted on a tripod with attached telescope, and a section through a laser beam transmitter set up below the first unit, with a contrivance for producing the fan-shaped beam.

On the surface above the shaft, in our example about five meters deep, a telescopic sight 7 stands on an adjustable tripod 6. In FIG. 1 the vertical distance between the two units is greatly reduced to facilitate the illustration. The telescopic sight 7 serves for taking bearings on a distant target, which in our example stands over the point toward which the pipe is to be laid. The laser beam transmitter 1 must have its principal axis, i.e. the original direction of the laser beam when the slope is set at zero, aligned parallel to the principal axis of the telescopic sight 7, which is the line of vision through the sight.

In the housing 3 of the laser beam transmitter 1 an arbor 8 is located, to which a lever 9 is fastened. The lever 9 supports 90° reflecting prism 10. The arbor 8 connects in a manner not shown with the outside of the housing and is fitted with a hand lever there. This hand lever permits either secure positioning of the prism 10 in the position shown in the figure, by means of stops or the like, or swinging it to a lower position out of the way of the laser beam. The control mechanism can also be designed in some other manner, for example to provide for swinging to the side away from the beam. The prism 10, which serves only to alter the path of the laser beam by 90°, can also be replaced by a simple reflector.

The laser beam thrown upward by the reflecting prism 10 passes through a cylindrical lens 11 located in an exit hole on the top of the laser beam transmitter. This cylindrical lens, ground planoconvex in the illustrated example, is positioned in the hole in such manner that its axis is aligned horizontally at right angles to the laser beam passing through (and also to the plane of the drawing). The laser beam is broadened into a fan-shaped beam 12, which diverges upward in a vertical plane through the principal axis of the laser beam transmitter 1. If a flat surface is placed anywhere in the path of the diverging beam 12, a thin line will appear, which is always vertically over the principal axis of the laser beam transmitter 1 and can be used for alignment with this unit at any height above it.

The fan-shaped beam 12 can be located most easily with a surveyor's rod or the like laid over the ditch in which the beam transmitter is located. The direction of the rod can then be compared with the direction of the laser beam transmitter. Since the line produced where the beam strikes any object is very thin and can be followed for some distance, the laser beam transmitter can be aligned with great accuracy.

The line produced by the fan-shaped beam can, by way of example, also be compared with a line marked on the underside of the telescopic sight 7, this line being parallel to the principal axis of the sight. However, observation of the beam is simpler and more precise if a receiving device 13 is used, which, as in FIG. 1, is mounted on the horizontally adjustable tripod 6 and supports the telescopic sight 7 on its upper side.

The receiving device 13 has on the underside of its housing 14 two entry windows fitted with ground glass screens 15 and 16. Above the screens are located reflectors 17 and 18 which, by altering the directions of the two entering beams by about 90°, permit observation of the ground glass screens through two prisms fixed in the center of the unit, between the reflectors. Of these prisms, the upper one is a 90° prism 19 and the other a five-sided prism 20. The prisms are designed so that, when observed from one side, they direct the line of sight along right angles to both reflectors 17 and 18.

Observation is made possible by an eyepiece 21 located in the side wall of the housing 14, adjacent to the two prisms and with its optic axis in the surface where the two prisms touch. The arrangement illustrated in the figures gives a field of vision through the eyepiece 21 such as that suggested by FIGS. 3a, 3b and 3c with their circular borders. In the middle of the field of vision the plane 22 where the two prisms 19 and 20 meet can be seen. Using an eyepiece 21 which makes possible a vertical picture, one can see in the upper half of the picture the ground glass screen 16, as it registers the beam shown in the figures by a dotted line, and in the lower half of the picture the screen 15. Center reference marks 23 and 24 on the screens 15 and 16, respectively, appear in a vertical line in the center of the picture.

When the receiving device 13 is located over the laser beam transmitter 1 in the manner shown, the fan-shaped beam 12 produces straight-line images on the screens 15 and 16, which are approximately parallel to the reference marks 23 and 24. These straight-line images on the screens are perceived through the eyepiece as bright lines parallel to the reference marks. By moving the two instruments with respect to each other, the images can be made to coincide with the reference line, whereby the instruments are aligned with each other.

Figure 4:
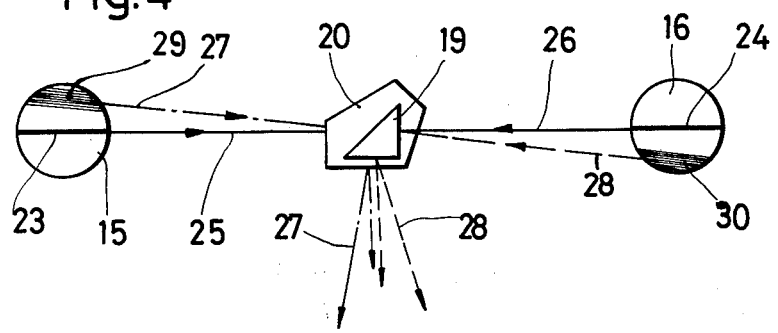
FIG. 4 is a schematic representation of the paths followed by the beams in the receiving unit.
Figure 2:
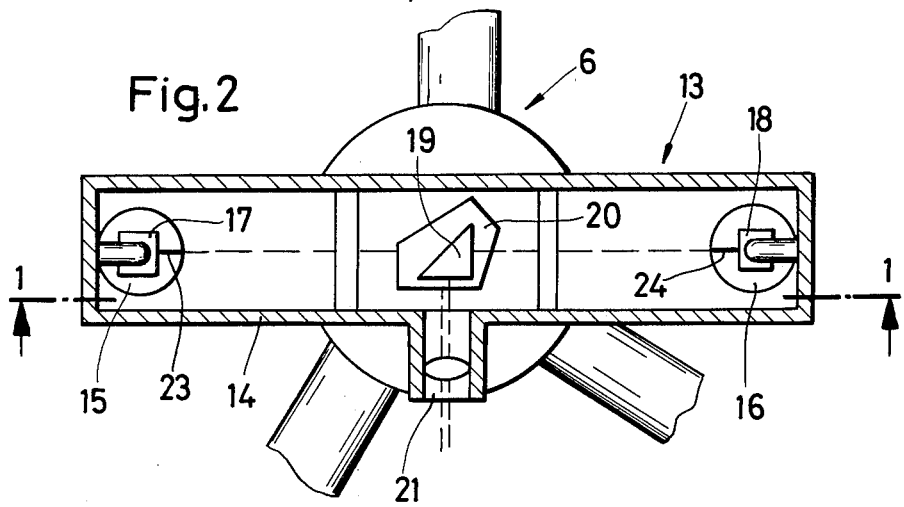
FIG. 2 represents a section along the line 2—2 in FIG. 1.

FIG. 4 illustrates how the prisms 19 and 20 work. The prisms are positioned with parallel axes in such a way that the beams which pass through the reference marks 23 and 24 of the screens 15 and 16, respectively, are bent at right angles toward the eyepiece. Observation through the eyepiece reveals an image such as those in FIGS. 3a through 3c. For the five-sided prism 20, the incoming beam and the reflected beam are always at right angles. So when the direction of the incoming beam is altered, in the illustrated case to the beam 27, the reflected beam is altered in the same direction by the same amount. With the 90° prism, an alteration of the incoming beam 28 by a certain amount and in a particular direction leads to an alteration of the reflected beam by the same amount but in the opposition direction. FIG. 4 illustrates this.

When the receiving device 13 positioned over the laser beam transmitter 1 is turned slightly in the horizontal, the images 29 and 30 on screens 15 and 16 respectively move to the sides, as shown in FIG. 4. The laser beam paths originating at the images 29 and 30, 27 and 28 respectively, shift sideways also, as shown in FIG. 4. Thus the two images seen through the eyepiece 21 move in opposite directions. The relation between the two movements is thus retained in the picture seen through the eyepiece.

Using two 90° reflecting prisms or two five-sided prisms, instead of the combination of the two, would cause the two images to wander in the same direction, so that it would be more difficult to detect a skewed alignment of the receiving unit 13 with respect to the laser beam transmitter 1.

Figure 3A:
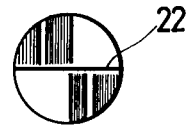
FIGS. 3a to 3c show three different images of the received beams, as they appear to an observer looking into the eyepiece of the receiving device shown in FIGS. 1 and 2, when the unit is misaligned in various ways.
Figure 3B:
Figure 3C:
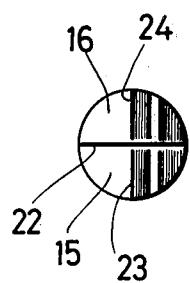

FIGS. 3a and 3b illustrate laser beam images produced by turning the receiving unit 13 with respect to the laser beam transmitter 1 in one direction or the other. The images are symmetric to the reference marks, showing that the receiving device 13 is, as a whole, symmetric to the fan-shaped beam. FIG. 3c shows a position in which the receiving device is parallel to the fan-shaped beam but slightly to one side of the proper vertical plane. For that reason the two images are aligned vertically but to the side of the reference marks 23 and 24.

Normally, small deviations from the vertical plane are not too important. The only important thing is ensuring strictly parallel alignment. In such cases the reference marks 23 and 24 on the ground glass screens may be omitted. Then the observer need only monitor the relative positions of the beam images 29 and 30.

It is advantageous to mount the telescopic sight 7 on top of the housing 14 of the receiving device 13 in such a way that it can be turned, so that the optical axis of the sight 7 can be aligned parallel to the principal axis of the receiving device 13, i.e., the longitudinal axis running through the reference marks 23 and 24.

The beam images 29 and 30 are shown in FIG. 4 in the slightly diffuse form usual at greater distances. In order to attain greater accuracy, a phase device, the construction of which is described in OS 16 73 846 (U.S. Pat. No. 3,617,135), is positioned in the path of the beam produced by the laser generator 4. This may, for example, be on one face of the reflecting prism 10, on a face of the cylindrical lens 11 or on a glass plate positioned between the two. A one-dimensional phase device consists simply of a thin film covering half the area through which the beam passes, so positioned that the edge of the film intersects the optical axis and thus the center of the beam. In the present case, the edge should be aligned with the fan-shaped beam. This will give the beam images the configuration represented in FIGS. 3a to 3c. In the middle of the line produced by the fan-shaped beam, a clearly delineated band of minimal intensity is produced, which permits highly precise alignment because it is so easy to perceive. Since a phase device of this sort diffuses the beam considerably along the zero line, even without a cylindrical lens, the fan-shaped beam 12 can be produced by the phase device without the aid of a cylindrical lens, if desired.

The arrangement of instruments shown in the figures has the advantage that observation of the telescopic sight 7 and the receiving device 13 through its eyepiece 21 can be carried out in quick succession by one man. However, an additional man will be needed to turn the laser beam transmitter correspondingly about its vertical axis. This situation can be remedied by positioning the receiving device on the laser beam transmitter below and mounting an additional laser generator like the original laser generator 4 on the telescopic sight 7, which will transmit beams downward. This generator will also be equipped with a cylindrical lens and a phase device. If, in this arrangement, the receiving device 13 or a receiving device of another type is designed with optoelectronic sensors, which turn the laser beam transmitter about its vertical axis by means of a differential amplifier and appropriate motors, the operator needs only to attend to the telescopic sight 7. The two units are automatically aligned parallel. In this case it is advantageous to provide means for automatic adjustment on the laser beam transmitter 1, since means for adjusting the alignment in the horizontal will be provided there anyway.

The operation of the system will be further simplified if the laser beam transmitter 1 is designed with an automatic levelling mechanism, which maintains the horizontal alignment of the housing 3. This is especially important when the ground on which the laser beam transmitter 1 is set up is subject to disturbance. An automatic levelling mechanism will maintain the desired slope of the laser generator 4 relative to the housing 3, so that the operator of the system is free to concentrate his attention on the remaining problems of alignment.

Figure 6:
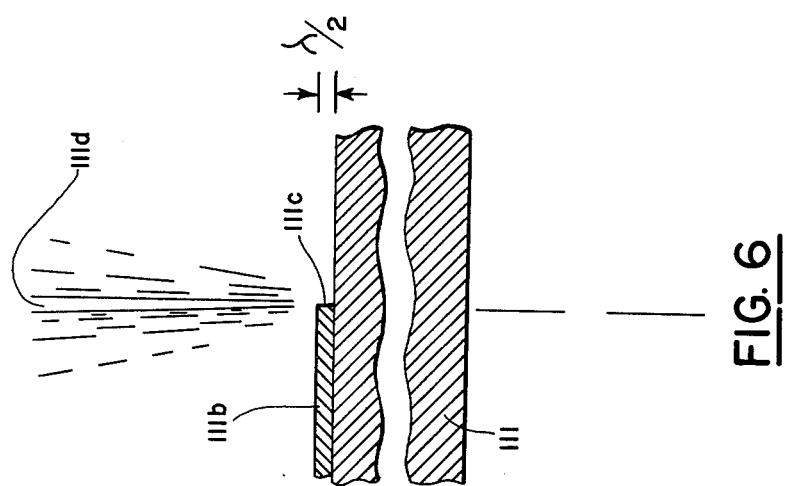
FIG. 6 is a greatly enlarged portion of the transmitter shown within the encircled portion 6—6 in FIG. 5.
Figure 5:
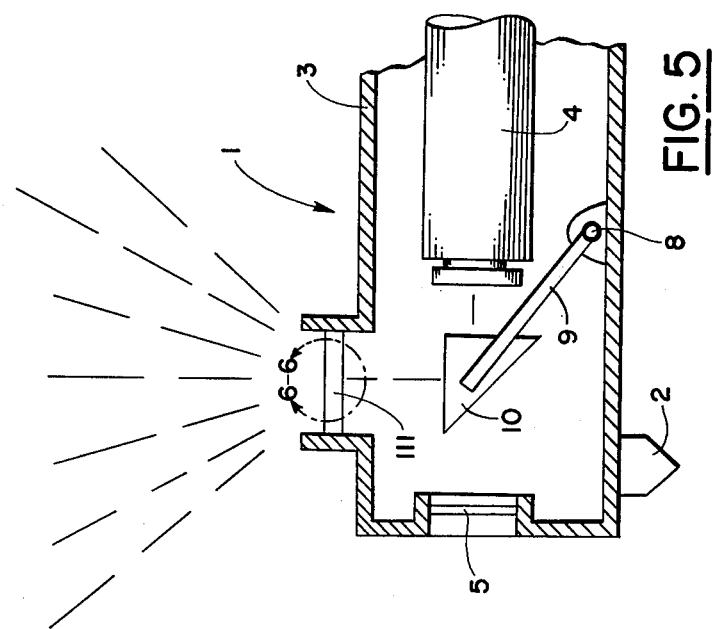
FIG. 5 represents a modified form of the laser beam transmitter illustrated in FIG. 1.

FIG. 5 is the same as FIG. 1 except that instead of the cylindrical lens 11, a phase plate 111 is inserted. FIG. 6 shows the enlarged part of FIG. 5 within the encircled part. The plate 111 is a common glass plate with parallel flat surfaces. The upper surface is covered by a thin film 111b having a thickness of half the wave length of the laser light. ($\lambda/2$) As indicated in FIG. 6, the thin film 11b covers only one half of the surface ending in the optical center line represented by the laser beam coming from below. This edge 111c of the thin film is aligned parallel to the principal axis of instrument 1 (for better illustration, FIG. 6 shows a section transverse to the edge 111c of the thin film 111b). FIG. 6 must be turned 90 degrees to correspond to FIG. 4.

I claim:

1. A system for the alignment of a laser beam generator instrument and a remotely located sighting instrument comprising:
   a. a projection device mounted on one of said instruments including a laser generator (4) for generating a laser beam and a fixed optical member (11) mounted in the path of said laser beam which projects a fan-shaped beam (12) on the longitudinal axis of said other instrument;
   b. a receiving device (13) having a pair of windows fitted with ground glass screens (15) and (16) spaced along the longitudinal axis of said receiving device which form an image of axially displaced portions of said fan-shaped beam on said ground glass screens;
   c. a system of optical elements (17–20) which deflect said fan-shaped beam images from each of said screens at angles which are precisely equal;
   d. an eyepiece (21) positioned for the simultaneous observation of said beam images formed on said screens (15) and (16) through said optical elements (17–20); and
   e. said optical system includes a five-sided prism (20) and a 90° prism (19), the axes of which are normal to the principal axes of said instruments and reflect said fan-shaped beam images received on said screens (15) and (16) via the reflectors (17) and (18) by 90°, so that relative angular movement of the principal axis of said instruments causes said fan-shaped beam images appearing on said screens (15) and (16) to move in opposite directions as viewed in said eyepiece (21).

2. A system as in claim 1 comprising:
   a. said fixed optical member has the form of a cylindrical lens (11).

3. A system as in claim 1 comprising:
   a. said fixed optical member for projecting a fan-shaped laser beam includes one-dimensional phase plate positioned with its edge aligned parallel to the principal axis of said instrument carrying said laser generator.

4. A system as in claim 1 comprising:
   a. said laser beam generator instrument carries said projection device and said sighting instrument carries said receiving device; and
   b. an adjustable element (10) mounted on said laser beam generator instrument movable into and out of the path of the beam created by said laser generator (4) for deflecting said laser beam by an angle of 90° when positioned in the path of said laser beam.

* * * * *